United States Patent Office 3,252,975
Patented May 24, 1966

3,252,975
DERIVATIVES OF 3,4-DIHYDRO-2H-1,2,4-BENZO-THIADIAZINE-1,1-DIOXIDE
George de Stevens, Willow Knoll, New Providence, and Lincoln Harvey Werner, Summit, N.J., assignors to Ciba Corporation, New York, N.Y., a corporation of Delaware
No Drawing. Filed Sept. 15, 1961, Ser. No. 138,280
10 Claims. (Cl. 260—243)

The present invention concerns benz-sulfamyl-3,4-dihydro-2H-1,2,4-benzothiadiazine-1,1-dioxide, in which the nitrogen atom of at least one of the two sulfamyl groups (one of which is part of the 3,4-dihydro-2H-1,2,4-thiadiazine-1,1-dioxide nucleus) carries a carbamyl group. More particularly, it relates to compounds having one of the following formulae:

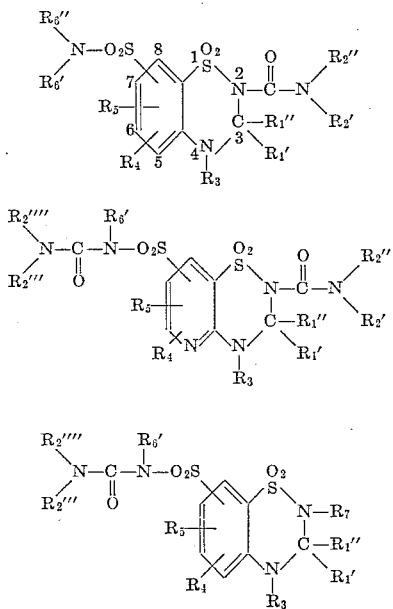

or in which each of the groups $R_1'$ and $R_1''$ stands for hydrogen or represents an aliphatic, cycloaliphatic, cycloaliphatic-aliphatic, carbocyclic aryl, carbocyclic aryl-aliphatic, heterocyclic aryl or heterocyclic aryl-aliphatic radical, or, when taken together, a divalent aliphatic radical, each of the groups $R_2'$, $R_2''$, $R_2'''$ and $R_2''''$ represents hydrogen, or an aliphatic, cycloaliphatic, cycloaliphatic-aliphatic, a carbocyclic aryl, a carbocyclic aryl-aliphatic, a heterocyclic aryl or a heterocyclic aryl-aliphatic radical, or, when two of these groups attached to one carbon atom are taken together, a divalent aliphatic radical, $R_3$ represents primarily hydrogen, as well as an aliphatic group, $R_4$ stands primarily for halogeno or trifluoromethyl, as well as for hydrogen, an aliphatic radical, etherified hydroxyl, nitro or any other suitable substituent, $R_5$ stands primarily for hydrogen, but may also represent the same groups as $R_4$, particularly lower alkyl or halogeno, each of the groups $R_6'$ and $R_6''$ represents primarily hydrogen, as well as an aliphatic or a substituted aliphatic radical, and $R_7$ represents hydrogen, an aliphatic or a substituted aliphatic radical, or salts of such compounds, as well as procedure for the preparation thereof.

The two groups $R_1'$ and $R_1''$ may represent hydrogen. At least one of these two groups may also stand for an aliphatic radical, particularly lower alkyl having preferably from one to seven, preferably from one to four, carbon atoms, e.g. methyl, ethyl, n-propyl, isopropyl, n-butyl, isobutyl, secondary butyl or tertiary butyl, as well as n-pentyl, isopentyl, neopentyl, n-hexyl and the like. Other aliphatic radicals are, for example, lower alkenyl, e.g. vinyl, 1-propenyl, allyl and the like, or lower alkynyl, e.g. ethynyl and the like. At least one of the groups $R_1'$ and $R_1''$ may also represent a cycloaliphatic radical, such as a monocyclic carbocyclic aliphatic radical, which has from three to seven carbon atoms as ring members, and in which the carbocyclic portion is saturated or may contain from one to two double bonds depending on the number of ring carbon atoms, such as cycloalkyl, which has from three to eight, especially from five to six, ring carbon atoms, e.g. cyclopentyl or cyclohexyl, as well as cyclopropyl, cyclobutyl, cycloheptyl, cyclo-octyl and the like, or cycloalkenyl, which has from five to eight, preferably from five to six, carbon atoms as ring members, e.g. 2-cyclopentenyl, 3-cyclopentenyl, 2-cyclohexenyl, 3-cyclohexenyl and the like, as well as 2-cycloheptenyl and the like. A cycloaliphatic-aliphatic radical, which may represent at least one of the substituents $R_1'$ and $R_1''$, stands primarily for monocyclic carbocyclic aliphatic-lower alkyl, in which the carbocyclic portion has from three to eight, preferably from five to six, carbon atoms as ring members and may be saturated or may have from one to two double bonds depending on the number of ring carbon atoms, and in which lower alkyl stands for lower alkylene having from one to seven, preferably from one to three, carbon atoms, such as cycloalkyl-lower alkyl, in which cycloalkyl has from three to eight, preferably from five to six, carbon atoms as ring members, e.g. cyclopropylmethyl, cyclobutylmethyl, cyclopentylmethyl, 1-cyclopentylethyl, 2-cyclopentylethyl, 1-cyclopenthylpropyl, 3-cyclopentylpropyl, cyclohexylmethyl, 1-cyclohexylethyl, 2-cyclohexylethyl, 1-cyclohexylpropyl, 3-cyclohexylpropyl, cycloheptylmethyl, cyclo-octylmethyl and the like, or cycloalkenyl-lower alkyl, in which cycloalkyl has from five to eight, preferably from five to six, ring carbon atoms, e.g. 1-cyclopentenylmethyl, 2-cyclopentenylmethyl, 2-cyclopentenylmethyl, 2-(2-cyclopentenyl)-ethyl, 2-cyclohexenylmethyl, 3-cyclohexenylmethyl, 1-(3-cyclohexenyl)-ethyl, 2-(2-cyclohexenyl)-ethyl, 3-(2-cyclohexenyl)-propyl and the like.

The above-mentioned radicals may contain functional groups as additional substituents. Such substituents are primarily attached to lower alkyl radicals, which may be represented by lower alkylene having preferably from one to five, especially from one to three, carbon atoms, particularly methylene, 1,1-ethylene, 1,2-ethylene, 1-methyl-1,2-ethylene, 2-methyl-1,2-ethylene, 1,1-propylene, 1,3-propylene or 2,2-propylene, as well as 1,1-butylene, 2-ethyl-1,2-ethylene, 3-methyl-1,3-propylene, 1,4-butylene, 1-ethyl-1-methyl-methylene, 1,2-dimethyl-1,2-ethylene, 1,5-pentylene, 1-methyl-1,4-butylene and the like.

Substituents are, for example, one or more than one halogeno atom, e.g. fluoro, bromo, or particularly chloro; halogeno-substituted lower alkyl radicals representing one of the groups $R_1'$ and $R_1''$, are, for example, trifluoromethyl, chloromethyl, 2-chloroethyl, dichloromethyl, trichloromethyl, bromomethyl and the like.

Other substituents of an aliphatic radical, particularly of a lower alkyl group, as well as a cycloaliphatic or a cycloaliphatic-aliphatic radical $R_1'$ or $R_1''$ are amino groups, for example, primary amino, or secondary amino, such as N-lower alkylamino, e.g. N-methylamino, N-ethylamino and the like, N-carbocyclic aryl-amino, e.g. N-phenylamino and the like, or N-carbocyclic aryl-lower alkyl-amino, e.g. N-benzylamino and the like, above all tertiary amino, particularly N,N-di-lower alkylamino, in which lower alkyl has from one to four carbon atoms, e.g. N,N-dimethylamino, N-ethyl-N-methyl-amino, N,N-diethylamino, N,N - dipropylamino, N,N - di - isopropylamino, N,N-di-n-butylamino and the like, N-cycloalkyl- N-lower alkyl amino, in which cycloalkyl has from five to six ring carbon atoms, and lower alkyl has from one to four carbon atoms, e.g. N-cyclopentyl-N-methyl-amino, N - cyclopentyl - N - ethyl - amino, N - cyclohexyl - N-methyl-amino and the like, N-carbocyclic aryl-lower alkyl-N-lower alkyl-amino, particularly N-lower alkyl-N-phenyl-lower alkyl-amino, in which lower alkyl has from one to four carbon atoms, e.g. N-benzyl-N-methyl-amino, N-benzyl-N-ethyl-amino, N-methyl-N-(2-phenyl-ethyl)-amino and the like, 1-N,N-alkylene-imino, in which alkylene has from four to six carbon atoms, such as 1-pyrrolidino, e.g. 1-pyrrolidino, 2-methyl-1-pyrrolidino and the like, 1-piperidino, e.g. 1-piperidino, 2-methyl-1-piperidino, 3-methyl-1-piperidino, 3-hydroxy-1-piperidino, 3-acetoxy-1-piperidino, 3-hydroxymethyl-1-piperidino and the like, 1-N,N-hexamethylene-imino or any other suitable 1-N,N-alkylene-imino group, 1-N,N-oxa-alkylene-imino, in which oxa-alkylene has preferably four carbon atoms, e.g. 4-morpholino and the like, 1-N,N-thia-alkylene-imino, in which thia-alkylene has preferably four carbon atoms, e.g. 4-thiamorpholino and the like, 1-N,N-aza-alkylene-imino, in which aza-alkylene has from four to six carbon atoms, such as 1-piperazino groups, e.g. 1-piperazino, or more especially 4-lower alkyl-1-piperazino, for example, 4-methyl-1-piperazino, 4-ethyl-1-piperazino and the like, as well as 4-hydroxyethyl-1-piperazino, 4-acetoxyethyl-1-piperazino and the like, or N,N-(3-aza-3-methyl-1,6-hexylene)imino, N,N-(4-aza-4-methyl-1,7-heptylene)-imino and the like. The teritary amino group and the aliphatic radical, particularly a lower alkyl group, to which the tertiary amino group is attached, may form together a heterocyclic radical, in which the tertiary amino group is part of the heterocycle, and one of the carbon atoms of the heterocyclic ring is connected directly or through a lower alkylene radical, e.g. methylene, 1,2-ethylene and the like, with the 3-position of the 3,4-dihydro-2H-1,2,4-benzothiadiazine-1,1-dioxide portion. Such groups are, for example, 1-methyl-3-pyrrolidinomethyl, 1-methyl-3-piperidino-methyl, 2-(1-methyl-2-piperidino)-ethyl, 1-methyl-4-piperidino and the like.

Other substituents attached to an aliphatic radical, particularly lower alkyl, or to a cycloaliphatic or cycloaliphatic - aliphatic radical, are N - acylamino groups, in which acyl represents the acyl radical of an organic carboxylic acid, for example, a substituted carbonic acid, e.g. methoxy-carbonic acid, ethoxy-carbonic acid, benzyloxy-carbonic acid and the like, an aliphatic carboxylic acid, such as a lower alkanoic acid, e.g. acetic, propionic, pivalic acid and the like, lower alkenoic acids, e.g. acrylic, methylacrylic acid and the like, an aliphatic dicarboxylic acid, e.g. oxalic, malonic, succinic, glutaric, adipic, maleic, fumaric acid and the like, or their halfesters with a lower alkanol, e.g. methanol, ethanol and the like, a carbocyclic aryl-carboxylic acid, particularly a monocyclic carbocyclic aryl-carboxylic acid, e.g. benzoic or a substituted benzoic acid, a carbocyclic arylaliphatic carboxylic acid, particularly a monocyclic carbocyclic aryl-lower alkanoic acid, e.g. phenylacetic, diphenylacetic, dihydrocinnamic acid and the like, which may have additional substituents in the aromatic portion, or a monocyclic carbocyclic aryl-lower alkenoic acid, e.g. cinnamic acid or a substituted cinnamic acid: substituents attached to the aliphatic or aromatic portions of such carboxylic acids are, for example, lower alkyl, e.g. methyl, ethyl and the like, lower alkoxy, e.g. methoxy, ethoxy and the like, lower alkylenedioxy, e.g. methylenedioxy, nitro, amino, particularly tertiary amino, such as N,N-di-lower alkyl-amino, e.g. N,N-dimethyl-amino, N,N-diethylamino and the like, halogeno, e.g. fluoro, chloro, bromo and the like, trifluoromethyl, or any other suitable substituent.

Acyl groups are additional substituents of an aliphatic, particularly a lower alkyl radical, as well as a cycloaliphatic or a cycloaliphatic-aliphatic radical, representing one of the groups $R_1'$ or $R_1''$; these are primarily acyl radicals of organic carboxylic acids, such as lower alkanoic acids, e.g. acetic, propionic, butyric acid and the like, as well as substituted carbonic acids, e.g. methoxy-carbonic acid, ethoxy-carbonic acid, benzyloxy-carbonic acid and the like, lower alkenoic acids, e.g. acrylic, methacrylic acid and the like, aliphatic dicarboxylic acids, e.g. oxalic, malonic, succinic, glutaric, adipic, maleic, furmaric acid and the like, or their halfesters with lower alkanols, e.g. methanol, ethanol and the like, carbocyclic aryl carboxylic acids, primarily monocyclic carbocyclic aryl carboxylic acids, e.g. benzoic or substituted benzoic acids, carbocyclic aryl-aliphatic carboxylic acids, primarily monocyclic carbocyclic aryl-lower alkanoic acids, e.g. phenylacetic, dihydrocinnamic acid and the like, which may contain additional substituents in the aromatic portion, or monocyclic carbocyclic aryl-lower alkenoic acids, e.g. cinnamic acid and the like, or substituted cinnamic acids. Substituents attached to the aliphatic or aromatic portions of such carboxylic acids are, for example, lower alkyl, e.g. methyl, ethyl and the like, lower alkoxy, e.g. methoxy, ethoxy and the like, lower alkylenedioxy, e.g. methylenedioxy and the like, nitro, amino, particularly tertiary amino, such as N,N-di-lower alkyl-amino, e.g. N,N-dimethylamino, N,N-diethylamino and the like, halogeno, e.g. fluoro, chloro, bromo and the like, or trifluoromethyl, or any other suitable substituent.

Other substituents attached to an aliphatic radical, particularly lower alkyl, as well as a cycloaliphatic or a cycloaliphatic-aliphatic radical representing one of the group $R_1'$ and $R_1''$, are hydroxyl groups. Eesterified hydroxyl groups may also be suitable as substituents, especially hydroxyl esterified with an organic carboxylic acid, for example, a substituted cabonic acid, e.g., methoxy-carbonic, ethoxy-carbonic, benzyloxy-carbonic and the like, an aliphatic carboxylic acid such as a lower alkanoic acid, e.g. acetic, propionic, pivalic acid and the like, a lower alkenoic acid, e.g acrylic, methylacrylic acid and the like, an aliphatic dicarboxylic acid, e.g. oxalic, malonic, succinic, glutaric, adipic, maleic, fumaric acid and the like, or a half-ester thereof with a lower alkanol, e.g. methanol, ethanol and the like, a carbocyclic aryl carboxylic acid, primarily a monocyclic carbocyclic aryl carboxylic acid, e.g. benzoic or substituted benzoic acid, a carbocyclic aryl-aliphatic carboxylic acid, primarily a monocyclic carbocyclic aryl-lower alkanoic acid, e.g. phenylacetic, dihydrocinnamic acid and the like, which may contain additional substituents in the aromatic portion, or a monocyclic carbocyclic aryl-lower alkenoic carboxylic acid, e.g. cinnamic acid and the like, or a substituted cinnamic acid. Substituents attached to the aliphatic or aromatic portion of such carboxylic acids, are, for example, lower alkyl, e.g. methyl, ethyl and the like, lower alkoxy, e.g. methoxy, ethoxy and the like, lower alkylenedioxy, e.g. methylenedioxy and the like, nitro, amino, particularly tertiary amino, such as N,N-di-lower alkyl-amino, e.g. N,N-dimethylamino, N,N-diethylamino and the like, halogeno, e.g. fluoro, chloro, bromo and the like, trifluoromethyl, or any other suitable substituent.

Further substituents of an aliphtic, particularly a lower alkyl, radical, as well as a cycloaliphatic or a cycloaliphatic-aliphatic radical representing $R_1'$ and $R_1''$, are etherified hydroxyl groups, which may be represented, for example, by aliphatic esterified hydroxyl, such as lower alkoxy, e.g. methoxy, ethoxy, n-propyloxy, isopropyloxy, n-butyloxy, isobutyloxy and the like, lower alkenyloxy, e.g. vinyloxy, allyloxy and the like, carbocyclic aryloxy, such as monocyclic carbocyclic aryloxy, e.g. phenyloxy or substituted phenyloxy, or bicyclic carbocyclic aryloxy, e.g. 1-naphthyloxy or 2-naphthyloxy or substituted naphthyloxy, or carbocyclic aryl-aliphatic etherified hydroxyl, such as monocyclic, carbocyclic aryl-lower alkoxy, e.g. benzyloxy or substituted benzyloxy. The etherifying radical, particularly a carbocyclic aryl group may have additional substituents; such substituents are, for example, lower alkyl, e.g. methyl, ethyl and the like, lower alkoxy, e.g. methoxy, ethoxy and the like, lower alkylenedioxy, e.g. methylenedioxy and the like, nitro, amino, particularly tertiary amino, such as N,N-di-lower alkyl-amino, e.g. N,N-dimethylamino, N,N-diethyl-amino and the like, halogeno, e.g. fluoro, chloro, bromo and the like, trifluoromethyl or any other suitable substituent.

In addition, an aliphatic radical, particularly lower alkyl, or a cycloaliphatic or cycloaliphatic-aliphatic radical representing the groups $R_1'$ and $R_1''$, may be substituted by mercapto, or more especially etherified mercapto, for example, aliphatic etherified mercapto, such as lower alkyl-mercapto, e.g. methylmercapto, ethylmercapto, n-propylmercapto, isopropylmercapto, n-butylmercapto, isobutylmercapto and the like, lower alkenylmercapto, e.g. vinylmercapto, allylmercapto and the like, as well as substituted aliphatic etherified mercapto, such as halogeno-lower alkyl-mercapto e.g., 2,2,2-trifluoroethylmercapto and the like, or carbocyclic aryl-mercapto, such as monocyclic carbocylic aryl-mercapto, e.g. phenylmercapto or substituted phenylmercapto, or bicyclic carbocyclic aryl-mercapto, e.g. 1-naphthylmercapto, 2-naphthylmercapto or substituted naphthylmercapto, or carbocyclic aryl- aliphatic etherified mercapto, primarily monocyclic carbocyclic aryl-lower alkyl-mercapto, e.g. benzylmercapto, 1-phenylethylmercapto, 2-phenylethylmercapto and the like, or substituted benzylmercapto, substituted 1-phenylethylmercapto, substituted 2-phenylethylmercapto and the like. As indicated, the etherifying portion of an etherified mercapto group may contain additional substituents, such as, for example, lower alkyl, e.g. methyl, ethyl and the like, lower alkoxy, e.g. methoxy, ethoxy and the like, lower alkylenedioxy, e.g. methylenedioxy and the like, nitro, amino, particularly teriary amino, such as N,N-di-lower alkylamino, e.g. N,N-dimethylamino, N,N-diethylamino and the like, halogeno, e.g. fluoro, chloro, bromo and the like, trifluoromethyl or any other suitable substitutent.

At least one of the groups $R_1'$ and $R_1''$ may also represent a carbocyclic aryl group, such as monocyclic carbocyclic aryl, e.g. phenyl or substituted phenyl, or bicyclic carbocyclic aryl, e.g. 1-naphthyl or 2-naphthyl or substituted naphthyl radicals, or a carbocyclic aryl-aliphatic radical, particularly monocyclic carbocyclic aryl-lower alkyl or bicyclic carbocyclic aryl-lower alkyl, e.g. benzyl, 1-phenylethyl, 2-phenylethyl, 3-phenylpropyl, 1-naphthylmethyl and the like, or these radicals substituted in the carbocyclic aryl portion, or monocyclic carbocyclic aryl-lower alkenyl or bicyclic carbocyclic aryl-lower alkenyl, e.g. 2-phenylethenyl and the like, as well as these radicals having in the carbocyclic portion additional substituents. Such substituents are, for example, lower alkyl, e.g. methyl, ethyl and the like, lower alkoxy, e.g. methoxy, ethoxy and the like, lower alkylenedioxy, e.g. methylenedioxy and the like, lower alkyl mercapto, e.g. methylmercapto and the like, amino, particularly tertiary amino, such as N,N-di-lower alkyl-amino, e.g. dimethylamino and the like, halogeno, e.g. fluoro, chloro, bromo and the like, trifluoromethyl and the like, Substituents attached to carbocylic aryl, particularly a phenyl portion may be attached to any of the available positions, whereby one or more than one of the same or of different substituents may be present.

Additional substituents representing at least one of the groups $R_1'$ and $R_1''$ are heterocyclic aryl radicals, particularly monocyclic heterocyclic aryl or bicyclic heterocyclic aryl, which may have from five to six atoms as ring members in the heterocyclic portion, such as pyridyl, e.g. 2-pyridyl, 3-pyridyl, 4-pyridyl and the like, thienyl, e.g. 2-thienyl and the like, furyl, e.g. 2-furyl and the like, quinolyl, e.g. 6-quinolyl and the like, or heterocyclic aryl-aliphatic radicals, such as monocyclic heterocyclic aryl-lower alkyl, for example, thenyl, e.g. 2-thenyl and the like. These radicals may have additional substituents, particularly lower alkyl, e.g. methyl, ethyl and the like, lower alkoxy, e.g. methoxy, ethoxy and the like, or halogeno, e.g. fluoro, chloro, bromo and the like.

When taken together, the groups $R_1'$ and $R_1''$ may also represent a divalent aliphatic radical, particularly lower alkylene having from four to six carbon atoms, e.g. 1,4-butylene, 1,5-pentylene, 1,6-hexylene and the like.

Each of the groups $R_2'$, $R_2''$, $R_2'''$ and $R_2''''$ stands for hydrogen, or, more especially, for an organic radical. Although each of these groups may represent an organic radical, preferably only one of the two attached to one nitrogen is an organic group, i.e. the nitrogen atom of a carbamyl group is preferably mono-substituted. Organic radicals representing $R_2'$, $R_2''$, $R_2'''$ and/or $R_2''''$ are, for example, aliphatic radicals, particularly lower alkyl, having preferably from one to seven carbon atoms, e.g. methyl, ethyl, n-propyl, isopropyl, n-butyl, isobutyl, secondary butyl, tertiary butyl, n-pentyl, isopentyl, neopentyl, n-hexyl, isohexyl, n-heptyl and the like, as well as lower alkenyl, such as an allylic lower alkenyl group having preferably from three to five carbon atoms, e.g. allyl, 2-methyl-allyl, 2-butenyl and the like, lower alkynyl, having preferably from three to five carbon atoms, e.g. propargyl and the like. Other organic radicals representing $R_2'$, $R_2''$, $R_2'''$ and $R_2''''$ may be cycloaliphatic radicals, such as cycloalkyl having from three to eight, preferably from five to six, ring carbon atoms, e.g. cyclopentyl or cyclohexyl, as well as cyclopropyl, cycloheptyl and the like, or cycloalkenyl having from five to eight, preferably from five to six, carbon atoms, e.g. 2-cyclopentenyl, 3-cyclopentenyl, 2-cyclohexenyl, 3-cyclohexenyl, 2-cycloheptenyl and the like, as well as cycloaliphatic-aliphatic radicals, such as cycloalkyl-lower alkyl, in which cycloalkyl has from three to eight, preferably from five to six, carbon atoms, e.g. cyclopentylmethyl, 1-cyclopentylethyl, 2-cyclopentylethyl, cyclohexylmethyl, 1-cyclohexylethyl, 3-cyclohexylpropyl and the like, as well as cyclopropylmethyl, cyclobutylmethyl, cycloheptylmethyl, 2-cycloheptylethyl, cyclo-octylmethyl and the like, cycloalkenyl-lower alkyl, in which cycloalkenyl has from five to eight, preferably from five to six carbon atoms, e.g. 2-cyclopentenylmethyl, 3-cyclopentenylmethyl, 2-(2-cyclopentenyl)-ethyl, 2-cyclohexenylmethyl, 3-cyclohexenyl-methyl, 1-(2-cyclohexenyl)-ethyl, 2-(3-cyclohexenyl)-ethyl and the like, as well as 2-cycloheptenylmethyl and the like, or any other suitable cycloaliphatic or cycloaliphatic-aliphatic radical.

The above aliphatic, cycloaliphatic and cycloaliphatic-aliphatic radicals may contain additional substituents such as, for example, lower alkyl, e.g. methyl, ethyl and the like, lower alkoxy, e.g. methoxy, ethoxy and the like, amino, particularly tertiary, amino, such as N,N-di-lower alkyl-amino, e.g. N,N-dimethylamino, N,N-diethylamino and the like, halogeno, e.g. fluoro, chloro, bromo and the like, trifluoromethyl or any other suitable substituent.

The groups $R_2'$, $R_2''$, $R_2'''$ and/or $R_2''''$ may also represent carbocyclic aryl radicals, particularly monocyclic carbocyclic aryl or bicyclic carbocyclic aryl, e.g. phenyl, 1-naphthyl, 2-naphthyl or substituted phenyl, substituted 1-naphthyl or substituted 2-naphthyl, as well as carbocyclic aryl-aliphatic radicals, particularly monocyclic carbocyclic aryl-aliphatic or bicyclic carbocyclic aryl-aliphatic radicals, such as phenyl-lower alkyl or naphthyl-lower alkyl, e.g. benzyl, 1-phenylethyl, 2-phenylethyl, 1-naphthylmethyl, 2-naphthylmethyl and the like, or phenyl-lower alkenyl or naphthyl-lower alkenyl, e.g. 2-phenylethenyl, 3-phenyl-2-propenyl, 2-naphthylethenyl and the like, or substituted phenyl-lower alkyl, substituted naphthyl-lower alkyl, substituted phenyl-lower alkenyl or substituted naphthyl-lower alkenyl. The carbocyclic aryl portions in the above groups may contain one or more than one of the same or different substituents attached to any of the positions available for substitution; such substituents are, for example, lower alkyl, e.g. methyl, ethyl, isopropyl and the like, lower alkoxy, e.g. methoxy, ethoxy and the like, lower alkylenedioxy, e.g. methylenedioxy and the like, acyloxy, e.g. ethoxycarbonyloxy, acetyloxy, propionyloxy and the like, nitro, amino, particularly tertiary amino, such as N,N-dilower alkylamino, e.g. N,N-dimethylamino, N,N-diethylamino and the like, halogeno, e.g. fluoro, chloro, bromo and the like, trifluoromethyl or any other suitable substituent.

The groups $R_2'$, $R_2''$, $R_2'''$ and/or $R_2''''$ may also represent heterocyclic aryl, primarily monocyclic heterocyclic aryl, such as, for example, pyridyl, e.g. 2-pyridyl, 3-pyridyl, 4-pyridyl, thienyl, e.g. 2-thienyl and the like, furyl, e.g. 2-furyl and the like, or bicyclic heterocyclic aryl, such as quinolyl, e.g. 4-quinolyl, 6-quinolyl and the like, as well as heterocyclic aryl-aliphatic radicals, particularly monocyclic heterocyclic aryl-lower alkyl, such as pyridyl-lower alkyl, e.g. 2-picolyl, 4-picolyl and the like, furyl-lower alkyl, e.g. furfuryl and the like, thienyl-lower alkyl, e.g. 2-thenyl and the like. The above heterocyclic aryl radicals may also contain one or more than one of the same or of different substituents attached to any positions available for substitution; substituents are, for example, lower alkyl, e.g. methyl, ethyl and the like, lower alkoxy, e.g. methoxy, ethoxy and the like, halogeno, e.g. fluoro, chloro, bromo and the like, trifluoromethyl or any other suitable substituents.

The groups $R_2'$ and $R_2''$, as well as $R_2'''$ and $R_2''''$ may also be taken together and form a divalent aliphatic radical, especially a lower alkylene radical, having from four to six carbon atoms, e.g. 1,4-butylene, 1,5-pentylene, 1,6-hexylene and the like.

The group $R_3$, attached to the anilin-type amino group of the 3,4-dihydro-2H-1,2,4-thiadiazine-1,1-dioxide portion of the compounds of this invention, represents primarily hydrogen, but may also stand for lower alkyl, e.g. methyl, ethyl and the like.

The group $R_4$, which is preferably attached to the 6-position of the 3,4-dihydro-2H-1,2,4-benzothiadiazine-1,1-dioxide ring system, stands primarily for halogeno, particularly chloro, as well as bromo or fluoro and the like, or for trifluoromethyl. It may also represent hydrogen, an aliphatic radical, such as lower alkyl, having preferably from one to four carbon atoms, e.g. methyl, ethyl, n-propyl, isopropyl, n-butyl and the like, or any other suitable aliphatic radical, etherified hydroxyl, particularly lower alkoxy, having preferably from one to four carbon atoms, e.g. methoxy, ethoxy and the like, or any other suitable etherified hydroxyl group, nitro or any other equivalent substituent.

The group $R_5$ represents above all hydrogen; it may stand for one of the substituents representing the group $R_4$. A substituent representing $R_5$ is preferably attached to the 5-position of the 3,4-dihydro-2H-1,2,4-benzothiadiazine-1,1-dioxide ring system.

Each of the radicals $R_6'$ and $R_6''$ of the sulfamyl group, which is preferably attached to the 7-position of the 3,4-dihydro-2H-1,2,4-benzothiadiazine-1,1-dioxide ring system, stands primarily for hydrogen. It may also represent an aliphatic radical, such as lower alkyl, having preferably from one to seven carbon atoms, e.g. methyl, ethyl, n-propyl, isopropyl, n-butyl, secondary butyl, n-pentyl, isohexyl, n-heptyl and the like, as well as lower alkenyl, particularly allylic lower alkenyl having from three to five carbon atoms, e.g. allyl, 2-methylallyl, 2-butenyl and the like, lower alkynyl having preferably from three to five carbon atoms, e.g. propargyl and the like, or a substituted aliphatic radical, particularly a carbocyclic aryl-aliphatic radical, such as phenyl-lower alkyl, e.g. benzyl, 1-phenylethyl, 2-phenylethyl and the like, or substituted phenyl-lower alkyl, which contain in the phenyl portion one or more than one of the same or of a different substituent, such as, for example, lower alkyl, e.g. methyl, ethyl, isopropyl and the like, lower alkoxy, e.g. methoxy, ethoxy and the like, halogeno, e.g. fluoro, chloro, bromo and the like, trifluoromethyl or any other suitable substituent.

The group $R_7$ represents hydrogen or an aliphatic radical, especially lower alkyl, having preferably from one to seven carbon atoms, e.g. methyl, ethyl, n-propyl, isopropyl, n-butyl, secondary butyl, n-pentyl, isohexyl, n-heptyl and the like, as well as lower alkenyl, particularly allylic lower alkenyl having from three to five carbon atoms, e.g. allyl, 2-methylallyl, 2-butenyl and the like, lower alkynyl having preferably from three to five carbon atoms, e.g. propargyl and the like, or a substituted aliphatic radical, particularly a carbocyclic aryl-aliphatic radical, such as phenyl-lower alkyl, e.g. benzyl, 1-phenylethyl, 2-phenylethyl and the like, or substituted phenyl-lower alkyl, which contain in the phenyl portion one or more than one of the same or of a different substituent, such as, for example, lower alkyl, e.g. methyl, ethyl, isopropyl and the like, lower alkoxy, e.g. methoxy, ethoxy and the like, halogeno, e.g. fluoro, chloro, bromo and the like, trifluoromethyl or any other suitable substituent.

Salts of the compounds of this invention are primarily the pharmaceutically acceptable, non-toxic salts with metals, particularly those with alkali metals, e.g. sodium, potassium and the like, as well as those with alkaline earth metals, e.g. magnesium, calcium and the like; mono- or poly-salts may be formed.

The compounds of the present invention have diuretic and saliuretic, particularly natriuretic properties, and are intended to be used as diuretic or saliuretic, particularly natriuretic agents having improved and outstanding properties to relieve conditions of excessive water and salt retention, for example, caused by kidney or heart ailments. The compounds of the present invention also exhibit a strong antihypertensive effect; they are, therefore, also useful as antihypertensive agents in the treatment of hypertensive conditions, particularly those coupled with water and salt retention, such as, for example, heart ailments and the like.

Particularly outstanding effects are shown by compounds having one of the following formulae:

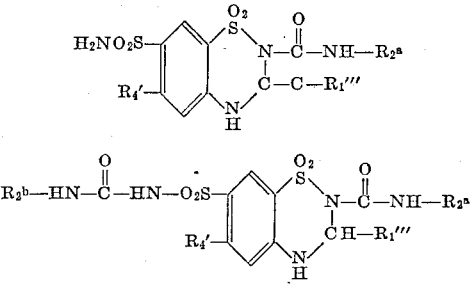

and

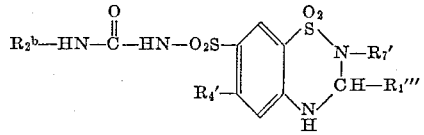

in which $R_1'''$ represents hydrogen, lower alkyl, e.g. methyl, ethyl, n-propyl, n-butyl, isobutyl and the like, halogeno-lower alkyl, e.g. chloromethyl, dichloromethyl, 2-chloroethyl, bromomethyl and the like, lower alkoxy-lower alkyl, e.g. ethoxymethyl and the like, lower alkyl-mercapto-lower alkyl, e.g. 2-methylmercaptoethyl and the like, halogeno-lower alkyl-mercapto-lower alkyl, e.g. 2, 2,2-trifluoroethyl-mercaptomethyl and the like, phenyl-lower alkyl-mercapto-lower alkyl, e.g. benzylmercaptomethyl and the like, lower alkenyl, e.g. 1-propenyl and the like, cycloalkyl having from five to six ring carbon atoms, e.g. cyclopentyl, cyclohexyl and the like, cycloalkenyl having from five to six ring carbon atoms, e.g. 3-cyclopentyl, 2-cyclohexyl, 3-cyclohexyl and the like, cycloalkyl-lower alkyl, in which cycloalkyl has from five to six ring carbon atoms, e.g. cyclopentylmethyl, 1-cyclopentylethyl, cyclohexylmethyl, 2-cyclohexylethyl and the like, cycloalkenyl-lower alkyl, in which cycloalkenyl has from five to six ring carbon atoms, e.g. 2-cyclopentenylmethyl, 1-(3-cyclopentenyl)-ethyl, 2-cyclohexenylmethyl, 3-cyclohexenylmethyl, 2-(3-cyclohexenyl)-ethyl and the like, phenyl-lower alkyl, e.g. benzyl, 1-phenylethyl, 2-phenylethyl and the like, or thienyl, each of the groups $R_2^a$ and $R_2^b$ represents lower alkyl, having preferably from one to seven carbon atoms, e.g. methyl, ethyl, n-propyl, isopropyl, n-butyl, isobutyl, secondary butyl, n-pentyl, neopentyl and the like, $R_4'$ stands for halogeno, particularly chloro or bromo, or for trifluoromethyl, and $R_7'$ represents lower alkyl, or alkali metal salts of such compounds.

This preferred group may be represented by the 6-chloro-2-(N-lower alkyl-carbamyl)-7-sulfamyl-3,4-dihydro-H-1,2,4-benzo-thiadiazine-1,1-dioxides, 6-chloro-3-lower alkyl-2-(N-lower alkyl-carbamyl)-7-sulfamyl-3,4-dihydro-2H-1,2,4-benzothiadiazine-1,1-dioxides, 6-chloro-3-chloro-lower alkyl-2-(N-lower alkyl-carbamyl)-7-sulfamyl-3,4-dihydro-2H-1,2,4-benzothiadiazine-1,1-dioxides, 6-chloro-3-cycloalkyl-2-(N-lower alkyl-carbamyl)-7-sulfamyl-3,4-dihydro-2H-1,2,4-benzothiadiazine-1,1-dioxides, in which cycloalkyl has from five to six ring carbon atoms, 6-chloro-3-cycloalkenyl-2-(N-lower alkyl-carbamyl)-7-sulfamyl-3,4-dihydro-2H-1,2,4-benzo-thiadiazine-1,1-dioxides, in which cycloalkenyl has from five to six ring carbon atoms, 6-chloro-3-cycloalkyl-lower alkyl-2-(N-lower alkyl-carbamyl)-7-sulfamyl-3,4-dihydro-2H-1,2,4-benzothiadiazine-1,1-dioxides, in which cycloalkyl has from five to six ring carbon atoms, 6-chloro-3-cycloalkenyl-lower alkyl-2-(N-lower alkyl-carbamyl)-7-sulfamyl-3,4-dihydro-2H-1,2,4-benzothiadiazine-1,1-dioxides, in which cycloalkenyl has from five to six ring carbon atoms, 6-chloro-2-(N-lower alkyl-carbamyl)-3-phenyl-lower alkyl-7-sulfamyl-3,4-dihydro-2H-1,2,4-benzothiadiazine-1,1-dioxides, 2-(N-lower alkyl-carbamyl)-7-sulfamyl-6-trifluoromethyl-3,4-dihydro-2H-1,2,4-benzothiadiazine-1,1-dioxides, 3-lower alkyl-2-(N-lower alkyl-carbamyl)-7-sulfamyl-6-trifluoromethyl-3,4-dihydro-2H-1,2,4-benzothiadiazine-1,1-dioxides, 3-chloro-lower alkyl-2-(N-lower alkyl-carbamyl)-7-sulfamyl-6-trifluoromethyl-3,4-dihydro-2H-1,2,4-benzothiadiazine-1,1-dioxides, 3-cycloalkyl-2-(N-lower alkyl-carbamyl)-7-sulfamyl-6-trifluoromethyl-3,4-dihydro-2H-1,2,4-benzothiadiazine-1,1-dioxides, in which cycloalkyl has from five to six ring carbon atoms, 3-cycloalkenyl-2-(N-lower alkyl-carbamyl)-7-sulfamyl-6-trifluoromethyl-3,4-dihydro-2H-1,2,4-benzothiadiazine-1,1-dioxides, in which cycloalkenyl has from five to six ring carbon atoms, 3-cycloalkyl-lower alkyl-2-(N-lower alkyl-carbamyl)-7-sulfamyl-6-trifluoromethyl-3,4-dihydro-2H-1,2,4-benzothiadiazine-1,1-dioxides, in which cycloalkyl has from five to six ring carbon atoms, 3-cycloalkenyl-lower alkyl-2-(N-lower alkyl-carbamyl)-7-sulfamyl-6-trifluoromethyl-3,4-dihydro-2H-1,2,4-benzothiadiazine-1,1-dioxides, in which cycloalkenyl has from five to six ring carbon atoms, 2-(N-lower alkyl-carbamyl)-3-phenyl-lower alkyl-7-sulfamyl-6-trifluoromethyl-3,4-dihydro-2H-1,2,4-benzothiadiazine-1,1-dioxides, 6-chloro-2-(N-lower alkyl-carbamyl)-7-[N-(N-lower alkyl-carbamyl)-sulfamyl]-3,4-dihydro-2H-1,2,4-benzothiadiazine-1,1-dioxides, 6-chloro-3-lower alkyl-2-(N-lower alkyl-carbamyl)-[N-(N-lower alkyl-carbamyl)-sulfamyl]-3,4-dihydro-2H-1,2,4-benzothiadiazine-1,1-dioxides, 6-chloro-3-chloro-lower alkyl-2-(N-lower alkyl-carbamyl)-7-[N-(N-lower alkyl-carbamyl)sulfamyl]-3,4-dihydro-2H-1,2,4-benzothiadiazine-1,1-dioxides, 6-chloro-3-cycloalkyl-2-(N-lower alkyl-carbamyl)-7-[N-(N-lower alkyl-carbamyl)-sulfamyl]-3,4-dihydro-2H-1,2,4-benzothiadiazine-1,1-dioxides, in which cycloalkyl has from five to six ring carbon atoms, 6-chloro-3-cycloalkenyl-2-(N-lower alkyl-carbamyl)-7-[N-(N-lower alkyl-carbamyl)-sulfamyl]-3,4-dihydro-2H-1,2,4-benzothiadiazine-1,1-dioxides, in which cycloalkenyl has from five to six ring carbon atoms, 6-chloro-3-cycloalkyl-lower alkyl-2-(N-lower alkyl-carbamyl)-7-[N-(N-lower alkyl-carbamyl)-sulfamyl]-3,4-dihydro-2H-1,2,4-benzothiadiazine-1,1-dioxides, in which cycloalkyl has from five to six ring carbon atoms, 6-chloro-3-cyclo-alkenyl-lower alkyl-2-(N-lower alkyl-carbamyl)-7-[N-(N-lower alkyl-carbamyl)-sulfamyl]-3,4-dihydro-2H-1,2,4-benzothiadiazine-1,1-dioxides, in which cycloalkenyl has from five to six ring carbon atoms, 6-chloro-2-(N-lower alkyl-carbamyl)-7-[N-(N-lower alkyl-carbamyl)-sulfamyl]-3-phenyl-lower alkyl-3,4-dihydro-2H-1,2,4-benzothiadiazine-1,1-dioxides, 2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, 3-lower alkyl-2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, 3-chloro-lower alkyl-2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, 3-cycloalkyl-2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, in which cycloalkyl has from five to six ring carbon atoms, 3-cycloalkenyl-2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, in which cycloalkenyl has from five to six ring carbon atoms, 3-cycloalkyl-lower alkyl-2-(N-lower alkylcarbamyl)-7-[N-(N-lower alkyl-carbamyl)-sulfamyl]-6-trifluoromethyl-3,4-dihydro-2H-1,2,4-benzothiadiazines-1,1-dioxides, in which cycloalkyl has from five to six ring carbon atoms, 3-cyclo-alkenyl-lower alkyl-2-(N-lower alkyl-carbamyl)-7-[N-(N-lower alkyl-carbamyl)-sulfamyl]-6-trifluoromethyl-3,4-dihydro-2H-1,2,4-benzothiadiazine-1,1-dioxides, in which cycloalkenyl has from five to six ring carbon atoms, 2-(N-lower alkyl-carbamyl)-7-[N-(N-lower alkyl-carbamyl)-sulfamyl]-3-phenyl-lower alkyl-6-trifluoromethyl-3,4-dihydro-2H-1,2,4-benzothiadiazine-1,1-dioxides and the like, 6-chloro-2-lower alkyl-7-[N-(N-lower alkyl-carbamyl)-sulfamyl]-3,4-dihydro-2H-1,2,4-benzothiadiazine-1,1-dioxides, 6-chloro-2,3-di-lower alkyl-7-[N-(N-lower alkyl-carbamyl)-sulfamyl]-3,4-dihydro-2H-1,2,4-benzothiadiazine-1,1-dioxides, 6-chloro-3-chloro-lower alkyl-2-lower alkyl-7-[N-(N-lower alkyl-carbamyl)-sulfamyl]3,4-dihydro-2H-1,2,4-benzothiadiazine-1,1-dioxides, 2-lower alkyl-7-[N-(N-lower alkyl-carbamyl)-sulfamyl]-6-trifluoromethyl-3,4-dihydro-2H-1,2,4-benzothiadiazine-1,1-dioxides, 2,3-di-lower alkyl-7-[N-(N-lower alkyl-carbamyl)-sulfamyl]-6-trifluoromethyl-3,4-dihydro-2H-1,2,4-benzothiadiazine-1,1-dioxides, 3-chloro-lower alkyl-2-lower alkyl-7-[N-(N-loweralkyl-carbamyl)-sulfamyl]-6-trifluoromethyl-3,4-dihydro-2H-1,2,4-benzothiadiazine-1,1-dioxides or equivalent compounds, and the alkali metal salts thereof.

The new compounds of this invention may be used in the form of pharmaceutical preparations, which contain the new 3,4-dihydro-2H-1,2,4-benzothiadiazine-1,1-dioxide compounds or the salts thereof in admixture with a pharmaceutical organic or inorganic, solid or liquid carrier suitable for enteral or parenteral administration. For making up the preparations there can be employed substances which do not react with the new compounds, such as water, gelatine, lactose, starches, stearic acid, magnesium stearate, magnesium aluminum silicate preparations, stearyl alcohol, talc, vegetable oils, benzyl alcohols, gums, waxes, propylene glycol, polyalkylene glycols or any other known carrier used for pharmaceutical preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying agents and the like, salts for varying the osmotic pressure, buffers, etc. They may also contain, in combination, other pharmacologically useful substances; such compounds are antihypertensive agents, such as Rauwolfia alkaloids, e.g. reserpine, rescinnamine or deserpidine, semisynthetic Rauwolfia alkaloids, e.g. syrosingopine and the like, Veratrum alkaloids, e.g. germine, protoveratrine and the like, synthetic antihypertensive agents, e.g. hydralazine, dihydralazine, guanethidine and the like, or ganglionic blockers, e.g. chlorisondamine and the like.

The compounds of this invention may be prepared according to known methods. For example, they may be obtained by reacting a compound of the formula:

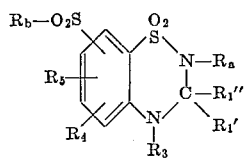

in which $R_1'$, $R_1''$, $R_3$, $R_4$ and $R_5$ have the previously given meaning, $R_a$ represents $R_7$, having the previously given meaning, or stands for the carbamyl group of the formula:

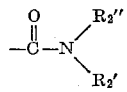

in which $R_1'$ and $R_2''$ have the previously given meaning, and $R_b$ represents the amino group of the formula:

in which $R_6'$ and $R_6''$ have the previously given meaning, or stands for a ureido group of the formula:

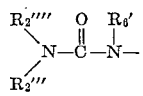

in which $R_2'''$, $R_2''''$ and $R_6'$ have the previously given meaning, with the proviso that at least one of the groups $R_a$ and $R_b$ represents the group $R_7$ and the amino group of the formula:

respectively, and with the further proviso that at least one of the groups $R_6'$, $R_6''$ and $R_7$ stands for hydrogen, or a salt thereof, with a reagent capable of replacing a hydrogen attached to a sulfamyl-nitrogen atom by a carbamyl group, and, if desired, converting a resulting salt into the free compound, and/or, if desired, converting a resulting compound into a salt thereof.

A suitable reagent capable of introducing a carbamyl group may be, for example, a metal isocyanate, particularly an alkali metal isocyanate, e.g. sodium isocyanate, potassium isocyanate and the like, or an alkaline earth metal isocyanate, e.g. magnesium isocyanate, calcium isocyanate and the like, or any other suitable metal isocyanate. Such reagent is employed in the presence of an acid, particularly a mineral acid, e.g. hydrochloric acid (which may be employed in its gaseous form), sulfuric acid and the like. The reaction is preferably carried out in the presence of an inert solvent, e.g. p-dioxane, diethyleneglycol dimethylether and the like, or any other suitable diluent; cooling and/or the atmosphere of an inert gas, e.g. nitrogen and the like, may be required. The metal isocyanate reagent yields N-unsubstituted carbamyl groups. In the presence of the acid, the metal isocyanate reagent yields cyanic acid, which reacts with the starting material. Cyanic acid, a stable compound, may, therefore, also be used as a suitable reagent in the above reaction to introduce an N-unsubstituted carbamyl group.

Introduction of a carbamyl group may also be achieved by treating the starting material with an organic isocyanate, such as an aliphatic isocyanate, particularly a lower alkyl isocyanate, e.g. methyl isocyanate, ethyl isocyanate, n-propyl isocyanate, isopropyl isocyanate, n-butyl isocyanate and the like, or any other suitable aliphatic or substituted aliphatic isocyanate, as well as a carbocyclic aryl-isocyanate, such as a monocyclic carbocyclic aryl isocyanate, e.g. phenyl isocyanate and the like, or a heterocyclic aryl-isocyanate. These isocyanate reactants, which are used in the absence, but preferably in the presence of an inert solvent, may also be formed in the course of the reaction and yield N-substituted carbamyl groups.

Other reagents, which may also be employed for the introdutcion of a carbamyl group are reactive derivatives of carbamic acids, such as, for example, lower alkyl carbamates, e.g. urethane and the like, which esters are employed together with a suitable reagent, particularly an aluminum lower alkoxide, such as aluminum isopropyloxide and the like, preferably in the presence of an inert solvent.

A carbamyl group may also replace hydrogen attached to a sulfamyl-nitrogen in the starting material by reacting the latter with phosgene in the presence of ammonia or an amine, such as a primary amine or a secondary amine, for example, an N-lower alkyl-amine, e.g. N-methylamine and the like, an N,N-di-lower alkyl-amine, e.g. N,N-dimethylamine and the like, aniline, an N-lower alkylaniline, e.g. N-methyl-aniline, N-ethyl-aniline and the like, an N-phenyl-lower alkyl-amine, e.g. N-benzylamine, N-(2 phenylethyl)-amine and the like, an N-lower alkyl-N-phenyl-lower alkyl-amine, e.g. N-benzyl-N-methyl-amine and the like, or any other suitable amine; the above reaction is carried out while cooling.

The 3,4-dihydro-2H-1,2,4-benzothiadiazine-1,1-dioxides used as the starting materials are known or may be prepared according to methods used for known analogs. For example, a compound of the formula:

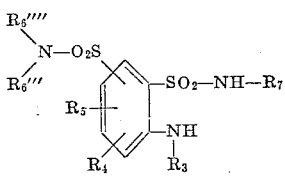

in which $R_3$, $R_4$, $R_5$, $R_6'''$, $R_6''''$ and $R_7$ have the previously given meaning, may be reacted with a carbonyl compound of the formula $R_1'(R_1'')C=O$, in which $R_1'$ and $R_1''$ have the previously given meaning, or a reactive derivative thereof to form the desired starting material.

The compounds of this invention may also be prepared, for example, by reacting a compound of the formula:

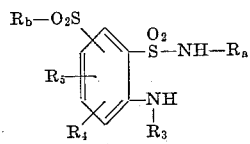

in which $R_3$, $R_4$, $R_5$, $R_a$ and $R_b$ have the previously given meaning, with the proviso that at least one of the groups $R_a$ and $R_b$ stands for a carbamyl group of the formula:

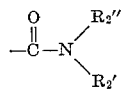

and a ureido group of the formula:

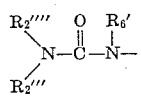

respectively, in which groups $R_2$, $R_2''$, $R_2'''$, $R_2''''$ and $R_6'$ have the previously given meaning, or a salt thereof, with a carbonyl compound of the formula:

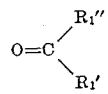

in which $R_1'$ and $R_1''$ have the previously given meaning, or a reactive derivative thereof, and, if desired, carrying out the optional steps.

Reactive derivatives of the carbonyl compound are acetals of aldehydes representing carbonyl compounds having the above formula, in which at least one of the groups $R_1'$ and $R_1''$ represents hydrogen, particularly acetals with a lower alkanol, e.g. methanol, ethanol and the like, or ketals of ketones representing carbonyl compounds of the above formula in which both of the groups $R_1'$ and $R_1''$ represent organic radicals, particularly those with lower alkylene-diols, e.g. ethylene glycol and the like. The reaction may be carried out in the absence or in the presence of a condensing reagent, such as, for example, of an acid, for example, a mineral acid, e.g. hydrochloric, hydrobromic, sulfuric acid and the like, if necessary, in anhydrous form, or of a base, such as an alkali metal hydroxide, e.g. lithium hydroxide, sodium hydroxide, potassium hydroxide and the like. An acid reagent may be required, whenever the carbonyl reagent is used in the form of a reactive derivative, such as an acetal or a ketal thereof. Aldehydes, representing carbonyl reagents of the formula $R_1'(R_1'')C=O$, in which at least one of the groups $R_1'$ and $R_1''$ stands for hydrogen, may also be in the form of a reactive polymeric substance; for example, formaldehyde may be employed in the form of a polymer, such as, for example, paraformaldehyde, trioxane and the like, or another formaldehyde furnishing reagent, e.g. hexamethylenetetramine and the like, and acetaldehyde may be reacted in the form of a polymer thereof, e.g. metaldehyde and the like. These polymeric derivatives are preferably employed in the presence of a suitable acid condensing reagent. Whenever formaldehyde or a reactive derivative thereof is used as the carbonyl compound, an about equivalent is used, whereas other carbonyl reagents may be employed in excess amounts, if necessary.

The reaction is preferably carried out in the presence of an inert solvent, for example, an ether, e.g. tetrahydrofuran, p-dioxane, diethyleneglycol dimethylether and the like, a lower alkanol, e.g. methanol, ethanol and the like, a formamide, e.g. N,N-dimethylformamide and the like, or a mixture of such solvents, an aqueous mixture of such diluents or water. Preferably, the reaction is completed at an elevated temperature, if necessary, in a closed vessel, and/or, in the atmosphere of an inert gas, e.g. nitrogen.

The starting materials used in the above reaction are known, or, if new may be prepared according to known methods. Starting materials, which contain at least one sulfonylureido group, particularly compounds of the formula:

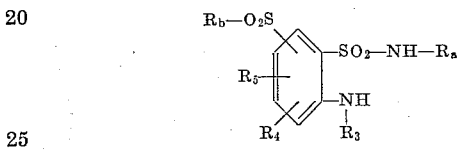

in which $R_3$, $R_4$, $R_5$, $R_a$ and $R_b$ have the previously given meaning, with the proviso that at least one of the groups $R_a$ and $R_b$ represents the carbamyl group of the formula:

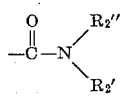

and a ureido group of the formula:

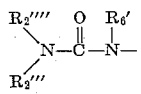

respectively, in which $R_2'$, $R_2''$, $R_2'''$, $R_2''''$ and $R_6'$ have the previously given meaning, particularly the compounds of the formula:

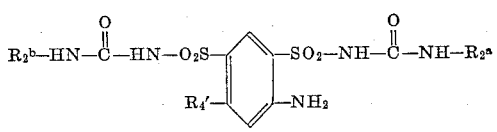

in which $R_4'$, $R_2^a$ and $R_2^b$ have the previously given meaning, whereby $R_2^a$ and $R_2^b$ stand preferably for identical lower alkyl groups, or salts thereof, are new and are intended to be included within the scope of this invention.

These starting materials may be prepared, for example, by reacting a compound of the formula:

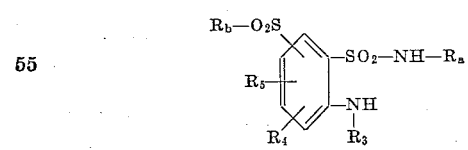

in which $R_3$, $R_4$, $R_5$, $R_a$ and $R_b$ have the previously given meaning, with the proviso that at least one of the groups $R_a$ and $R_b$ stands for the group $R_7$ having the previously given meaning and the amino group of the formula:

respectively, in which $R_6'$ and $R_6''$ has the previously given meaning, and with the further proviso that at least one of the groups $R_6'$, $R_6''$ and $R_7$ stands for hydrogen, or a salt thereof, with a reagent capable of replacing a hydrogen attached to a sulfamyl-nitrogen atom by a carbamyl group, and, if desired, carrying out the optional steps. The above reaction is carried out according to the previously described procedure.

Compounds of the present invention may also be prepared, for example, by reacting a compound having the formula:

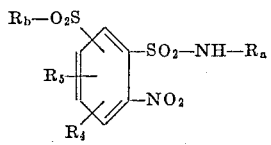

in which $R_4$, $R_5$, $R_a$ and $R_b$ have the previously given meaning, with the proviso that at least one of the groups $R_a$ and $R_b$ represents a carbamyl group of the formula:

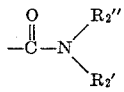

and a ureido group of the formula:

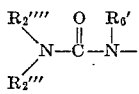

respectively, in which formulae $R_2'$, $R_2''$, $R_2'''$, $R_2''''$ and $R_6'$ have the previously given meaning, or a salt thereof, with a carbonyl compounds of the formula $R_1'(R_1'')C=O$, in which $R_1'$ and $R_1''$ have the previously given meaning, or a reactive derivative thereof, in the presence of a hydrogenating agent, and, if desired, carrying out the optional steps.

The carbonyl compound may be used in the form of a reactive derivative, such as an acetal or a ketal thereof, or in the form of a reactive polymeric derivative thereof, such as those described hereinbefore. Derivatives of carbonyl reagents, which may require the presence of an acidic medium, are preferably used, whenever the reaction is carried out in the presence of an acid reagent. The two reactants are advantageously used in approximately equimolar amounts; a slight excess may be advantageous to ensure a complete reaction, particularly, if the reactants are used in an open vessel, whereby volatility losses may occur.

Catalytically activated hydrogen is a suitable hydrogenation reagent; hydrogen in the presence of a catalyst containing a metal of the eight group of the Periodic System, such as nickel and the like, is preferred. Care has to be taken that no additional groups, such as aromatically bonud halogeno, e.g. chloro, are affected. The reduction may be performed under increased pressure, preferably in the presence of a small amount of an alkaline reagent, such as an alkali metal hydroxide, e.g. sodium hydroxide, potassium hydroxide and the like; in such case, the carbonyl reagent is preferably present in its free form, and not as a reactive derivative thereof. The hydrogenation in the presence of a catalyst is carried out at room temperature or at elevated temperature.

Other suitable hydrogenation reagents are chemical reducing reagents, such as a metal in the presence of an acid, for example, zinc, tin, iron and the like in the presence of a mineral acid, e.g. hydrochloric, hydrobromic, sulfuric acid and the like. If necessary, cooling or heating may be applied.

The above-described procedure is preferably carried out in the presence of a suitable diluent, such as a lower alkanol, e.g. methanol, ethanol and the like, an ether, e.g. tetrahydrofuran, p-dioxane, diethyleneglycol dimethylether and the like, or any other inert solvent.

The starting materials are known or, if new, may be prepared according to known methods. Nitrobenzene compounds of the formula:

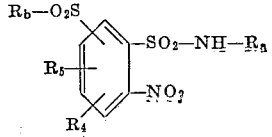

in which $R_4$, $R_5$, $R_a$ and $R_b$ have the previously given meaning, with the proviso that at least one of the groups $R_a$ and $R_b$ stands for a carbamyl group of the formula:

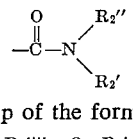

and for a ureido group of the formula:

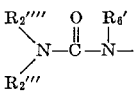

respectively, in which formulae $R_2'$, $R_2''$, $R_2'''$, $R_2''''$ and $R_6'$ have the previously given meaning, particularly compounds of the formula:

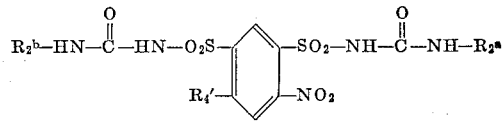

in which $R_4'$, $R_2^a$ and $R_2^b$ have the previously given meaning, whereby $R_2^a$ and $R_2^b$ preferably stand for the identical lower alkyl groups, or salts thereof, are new and are intended to be included within the scope of this invention.

These new starting materials may be prepared, for example, by reacting a compound of the formula:

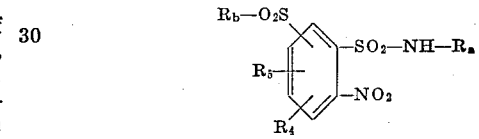

in which $R_4$, $R_5$, $R_a$ and $R_b$ have the previously given meaning, with the proviso that at least one of the groups $R_a$ and $R_b$ stands for the group $R_7$ having the previously given meaning and the amino group of the formula:

respectively, in which $R_6'$ and $R_6''$ has the previously given meaning, and with the further proviso that at least one of the groups $R_6'$, $R_6''$ and $R_7$ stands for hydrogen, or a salt thereof, with a reagent capable of replacing a hydrogen attached to a sulfamyl-nitrogen atom by a carbamyl group, and, if desired, carrying out the optional steps.

The above reaction is carried out according to the previously described procedure.

The resulting compounds of this invention, including the intermediates used in the various preparations may be present in the form of a free compound or of a salt. A resulting salt, particularly an alkali metal salt, may be converted into the free compound by treatment with an acidic reagent, such as a mineral acid, e.g. hydrochloric, sulfuric acid and the like. A free compound may be converted into a salt, particularly an alkali metal salt by treatment with a suitable metal compound, such as an alkali metal hydroxide, e.g. sodium hydroxide, potassium hydroxide and the like, in a solvent, such as in a lower alkanol, e.g. methanol, ethanol and the like, or in water and evaporating the solvent. Mono- or poly-salts may be obtained.

Any resulting racemate may be converted into the antipodes thereof according to methods used for resolving racemates.

The invention also comprises any modification of the process wherein a compound obtainable as an intermediate at any stage of the process is used as starting material and the remaining step(s) of the process is (are) carried out, as well as any new intermediates.

In the process of this invention such starting materials are preferably used which lead to final products men-

Example 1

A solution of 7.5 g. of 6-chloro-7-sulfamyl-3,4-dihydro-2H-1,2,4-benzothiadiazine-1,1-dioxide and 1.0 g. of sodium hydroxide in 80 ml. of water and 100 ml. of acetone is cooled to 10° and 2.5 g. of n-butyl-isocyanate is added dropwise. The reaction mixture is stirred for twenty minutes, the solid material is filtered off and two-thirds of the filtrate is evaporated under reduced pressure. The solid material is again filtered off, the filtrate is acidified with acetic acid, and the precipitate is collected. The desired 2-(N-n-butyl-carbamyl)-6-chloro-7-sulfamyl-3,4-dihydro-2H-1,2,4-benzothiadiazine-1,1-dioxide of the formula:

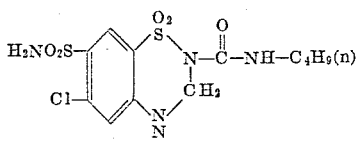

is purified by dissolving the solid material in aqueous sodium hydroxide and precipitating it with hydrochloric acid, M.P. 174°.

Example 2

To a mixture of 2.0 g. of 6-chloro-2-methyl-7-sulfamyl-3,4-dihydro-2H-1,2,4-benzothiadiazine-1,1-dioxide and 0.3 g. of sodium hydroxide in 40 ml. of water and 50 ml. of acetone, kept at about 10°, is added dropwise 0.32 g. of n-butyl-isocyanate. The reaction mixture is worked up as shown in Example 1 to yield the desired 7-[N-(N-n-butyl-carbamyl)-sulfamyl]-6-chloro-2-methyl-3,4-dihydro-2H-1,2,4-benzothiadiazine-1,1-dioxide of the formula:

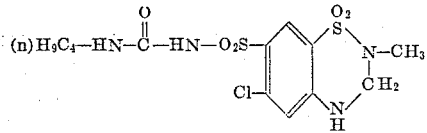

which is purified by precipitating it with hydrochloric acid from an aqueous sodium hydroxide solution; its infrared absorption spectrum shows a strong band at 1707 cm.$^{-1}$ and a medium strong band at 1675 cm.$^{-1}$, indicating the presence of a carbamyl group.

Example 3

To a cold mixture of 4.3 g. of 6-chloro-3-chloromethyl-7-sulfamyl-3,4-dihydro-2H-1,2,4-benzothiadiazine-1,1-dioxide and 1.0 g. of sodium hydroxide in 72 ml. of water and 90 ml. of acetone is added dropwise 2.5 g. of n-butyl-isocyanate, and it is worked up as shown in Example 1. The resulting precipitate is dissolved in aqueous ammonia, and the solution is acidified by adding acetic acid. The 2-(N-n-butyl-carbamyl)-6-chloro-3-chloromethyl-7-sulfamyl-3,4-dihydro-2H-1,2,4-benzothiadiazine-1,1-dioxide of the formula:

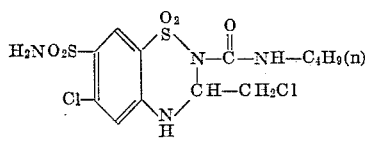

precipitates first, M.P. 160–165°, whereas the 2-(N-n-butyl-carbamyl)-7-[N-(N-n-butyl-carbamyl)-sulfamyl]-6-chloro-3-chloromethyl-3,4-dihydro-2H-1,2,4-benzothiadiazine-1,1-dioxide of the formula:

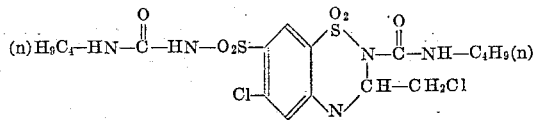

is obtained as the second crop, M.P. 137–140°.

Example 4

A mixture of 2.4 g. of 2,4-bis-[N-(N-n-butyl-carbamyl)-sulfamyl]-5-chloro-aniline and 0.15 g. of paraformaldehyde in 25 ml. of diethyleneglycol dimethylether containing a small amount of concentrated hydrochloric acid, is heated at 80–90° for two hours. The solvent is evaporated and the residue is treated with water to yield the desired 2-(N-n-butyl-carbamyl)-7-[N-(N-n-butyl-carbamyl)-sulfamyl]-6-chloro-3,4-dihydro-2H-1,2,4-benzothiadiazine-1,1-dioxide of the formula:

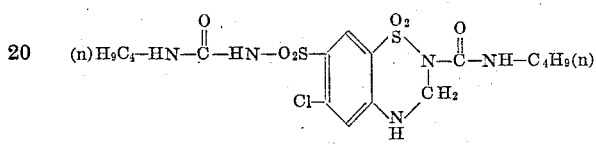

which shows the characteristic carbamyl bands at about 1707 cm.$^{-1}$ (strong) and 1675 cm.$^{-1}$ (medium strong) in the infrared absorption spectrum.

The starting materials may be prepared as follows: To a solution of 4.0 g. of sodium hydroxide in 100 ml. of acetone and 80 ml. of water is added 14.3 g. of 5-chloro-2,4-disulfamyl-aniline; the mixture is cooled to 10°, and 9.9 g. of n-butyl-isocyanate is added dropwise. After stirring for twenty minutes, the solid material is filtered off, two thirds of the solvent is stripped off under reduced pressure, the precipitate is removed, and the filtrate is acidified with acetic acid. The solid material representing the desired 2,4-bis-[N-(N-n-butyl-carbamyl)-sulfamyl]-5-chloro-aniline of the formula:

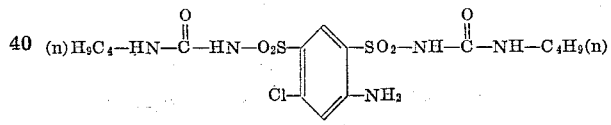

is recrystallized from a mixture of ethanol and water, M.P. 170–171°.

Example 5

A mixture of 4.0 g. of 2,4-bis-[N-(N-n-butyl-carbamyl)-sulfamyl]-5-methyl-aniline and 0.8 g. of dimethoxyethane in 25 ml. of diethyleneglycol dimethylether containing a small amount of hydrogen chloride, is reacted and worked up as shown in Example 4; the desired 2-(N-n-butyl-carbamyl)-7-[N-(N-n-butyl-carbamyl)-sulfamyl]-3,6-dimethyl-3,4-dihydro-2H-1,2,4-benzothiadiazine-1,1-dioxide of the formula:

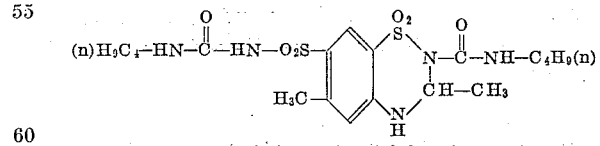

shows the characteristic carbamyl bands at about 1707 cm.$^{-1}$ and 1675 cm.$^{-1}$ in the infrared absorption spectrum.

The starting material may be prepared, for example, by reacting a cold solution of 6.6 g. of 2,4-disulfamyl-5-methyl-aniline and 2.0 g. of sodium hydroxide in 70 ml. of water and 90 ml. of acetone with 5.0 g. of n-butyl-isocyanate according to the procedure described in Example 4; the desired 2,4-bis-[N-(N-n-butyl-carbamyl)-sulfamyl]-5-methyl-aniline of the formula:

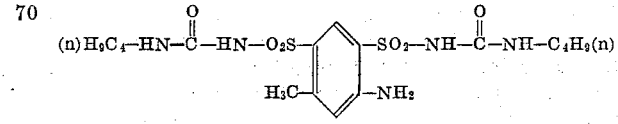

melts at 162–164°.

Example 6

To a mixture of 2.5 g. of 2,4-bis-[N-(N-n-butyl-carbamyl)-sulfamyl]-5-chloro-nitrobenzene and 1.5 g. of Raney nickel in 30 ml. of ethanol and 4 ml. of water containing 0.05 g. of sodium hydroxide, is added 0.39 ml. of a 36.3 percent aqueous solution of formaldehyde. The mixture is placed into a pressure hydrogenation apparatus and treated with hydrogen at about 3 atmospheres pressure. After the theoretical amount of hydrogen has been absorbed, the reaction mixture is filtered, the filtrate is neutralized and concentrated to dryness. The residue is crystallized and yields the desired 2-(N-n-butyl-carbamyl)-7-[N-(N-n-butyl-carbamyl) - sulfamyl]-6-chloro-3,4-dihydro-2H-1,2,4-benzothiadiazine-1,1-dioxide, which is identical with the compound described in Example 4.

The starting material may be prepared, for example, by reacting 5-chloro-2,4-disulfamyl-amine and 2.0 g. of sodium hydroxide in 70 ml. of water and 90 ml. of acetone with 5.0 g. of n-butyl-isocyanate at a temperature of about 10°; the desired 2,4-bis-[N-(N-n-butyl-carbamyl)-sulfamyl]-5-chloro-nitrobenzene of the formula:

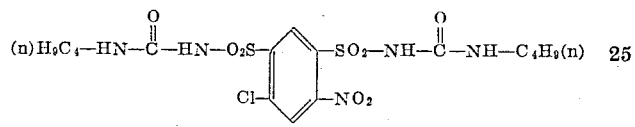

melts at 177–179°.

Example 7

A mixture of 1.5 g. of 2,4-bis-[N-(N-n-butyl-carbamyl)-sulfamyl]-5-chloro-6-methyl-aniline and 0.1 g. of paraformaldehyde in 20 ml. of diethyleneglycol dimethyl-ether containing a small amount of hydrochloric acid is reacted as shown in Example 4; the desired 2-(N-n-butyl-carbamyl)-7 - [N-(N-n-butyl - carbamyl) - sulfamyl]-6-chloro-5-methyl - 3,4-dihydro-2H-1,2,4 - benzothiadiazine-1,1-dioxide of the formula:

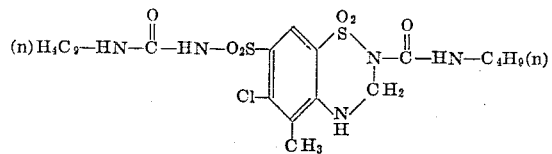

is isolated according to the procedure described in Example 4 and shows the characteristic infrared absorption bands at about 1707 cm.$^{-1}$ and 1675 cm.$^{-1}$.

The starting material may be prepared, for example, by reacting 6.0 g. of 5-chloro-2,4-disulfamyl-6-methyl-aniline and 1.6 g. of sodium hydroxide in 70 ml. of water and 90 ml. of acetone with 4.0 g. of n-butyl-isocyanate as described in Example 4; the desired 2,4-bis-[N-(N-n-butyl-carbamyl)-sulfamyl] - 5-chloro-6-methyl-aniline of the formula:

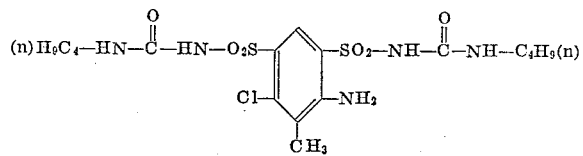

melts at 200–202°.

Example 8

A solution of 7.5 g. of 6-chloro-7-sulfamyl-3,4-dihydro-2H-1,2,4-benzothiadiazine-1,1-dioxide and 1.0 g. of sodium hydroxide in 72 ml. of water and 90 ml. of acetone is cooled to 10° and treated with 1.8 g. of ethyl-isocyanate; the reaction mixture is worked up as shown in Example 1 to yield the 6-chloro-2-(N-ethyl-carbamyl)-7-sulfamyl-3,4-dihydro-2H-1,2,4 - benzothiadiazine-1,1-dioxide of the formula:

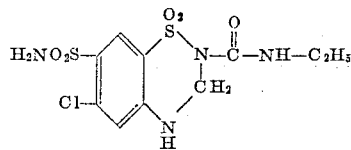

which melts at 200° as the hydrate.

Example 9

To a mixture of 3.2 g. of 5-chloro-2,4-bits-[N-(N-ethyl-carbamyl)-sulfamyl]-nitrobenzene and 2.0 g. of Raney nickel in 40 ml. of ethanol and 5 ml. of water containing 0.07 g. of sodium hydroxide is added 0.58 ml. of a 36.3 percent aqueous solution of formaldehyde, and is then treated with hydrogen as described in Example 6 to yield the desired 6-chloro-2-(N-ethyl-sulfamyl)-7-[N-(N-ethyl-carbamyl)-sulfamyl]-3,4-dihydro-2H-1,2,4 - benzothiadiazine-1,1-dioxide of the formula:

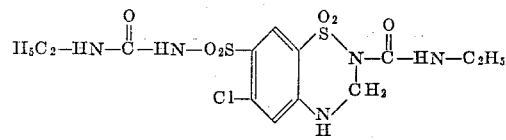

which shows the characteristic carbamyl bands in the infrared absorption spectrum.

The starting material is prepared, for example, by reacting 6.3 g. of 5-chloro-2,4-disulfamyl-nitrobenzene and 2.0 g. of sodium hydroxide in 72 ml. of water and 90 ml. of acetone with 2.9 g. of ethylisocyanate according to the procedure described in Example 4; the 5-chloro-2,4-bis-[N - (N - ethyl-carbamyl)-sulfamyl]-nitrobenzene of the formula:

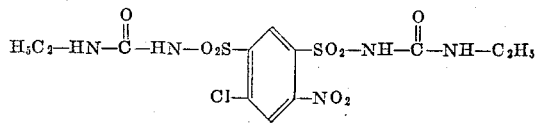

melts at 132–134° after recrystallization from acetone.

Other compounds, such as, for example, 3-benzyl-6-chloro-2-(N-isopropyl-carbamyl)-7-sulfamyl-3,4-dihydro-2H-1,2,4-benzo-thiadiazine-1,1-dioxide, 3-benzyl-2-(N-methyl-carbamyl)-7-sulfamyl-6-trifluoromethyl-3,4-dihydro-2H-1,2,4-benzothiadiazine-1,1-dioxide, 2-(N-n-butyl-carbamyl)-6-chloro-3-(1-phenylethyl)-7-sulfamyl-3,4-dihydro-2H-1,2,4-benzothiadiazine-1,1-dioxide, 6-bromo-2-(N-n-butyl-carbamyl)-7-[N-(N-n-butyl-carbamyl)-sulfamyl]-3,4-dihydro-2H-1,2,4-benzo-thiadiazine-1,1-dioxide, 2-(N-n-butyl-carbamyl)-6-chloro-3-cyclohexenyl-7-sulfamyl-3,4-dihydro-2H-1,2,4-benzothiadiazine-1,1-dioxide, 2-(N-ethyl-carbamyl)-6-chloro-3-cyclopentyl-7-sulfamyl-3,4-dihydro-2H-1,2,4-benzothiadiazine-1,1-dioxide, 2-(N-n-butyl-carbamyl)-6-chloro-3-cyclopentylmethyl-7-sulfamyl-3,4-dihydro-2H-1,2,4-benzothiadiazine-1,1-dioxide, 2-(N-n-butyl-carbamyl)-7-[N-(N-n-butyl-carbamyl)-sulfamyl]-6-chloro-3-cyclopentylmethyl-3,4-dihydro-2H-1,2,4-benzothiadiazine-1,1-dioxide, 2-(N-n-butyl-carbamyl)-6-chloro-3-dichloromethyl-7-sulfamyl-3,4-dihydro-2H-1,2,4-benzothiadiazine-1,1-dioxide, 2-(N-ethyl-carbamyl)-7-sulfamyl-6-trifluoromethyl-3,4-dihydro-2H-1,2,4-benzothiadiazine-1,1-dioxide, 2-(N-n-butyl-carbamyl)-6-chloro-7-sulfamyl-3-(2,2,2-trifluoroethyl)-mercaptomethyl-3,4-dihydro-2H-1,2,4-benzothiadiazine-1,1-dioxide and the like, may be prepared according to one of the above-described procedures.

What is claimed is:

1. A member selected from the group consisting of a compound having one of the formulae

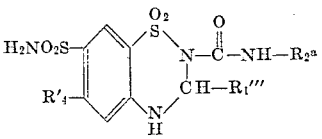

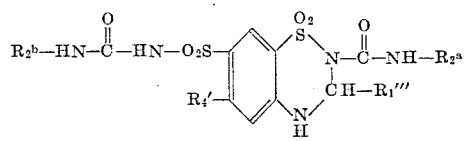

and

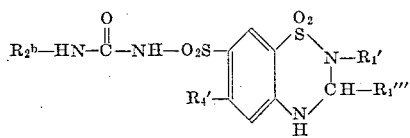

in which $R_1'''$ is a member selected from the group consisting of hydrogen, lower alkyl, halogeno-lower alkyl, lower alkoxy-lower alkyl, lower alkyl-mercapto-lower alkyl, halogeno-lower alkyl-mercapto-lower alkyl, phenyl-lower alkyl-mercapto-lower alkyl, lower alkenyl, cycloalkyl having from five to six ring carbon atoms, cycloalkenyl having from five to six ring carbon atoms, cycloalkyl-lower alkyl, in which cycloalkyl has from five to six carbon atoms, cycloalkenyl-lower alkyl, in which cycloalkenyl has from five to six carbon atoms, phenyl-lower alkyl and thienyl, each of the groups $R_2^a$, $R_2^b$ and $R_1'$ is lower alkyl, and $R_4'$ is a member selected from the group consisting of halogeno and trifluoromethyl, and a pharmaceutically acceptable salt with a member selected from the group consisting of an alkali metal and an earth alkaline metal.

2. 6-chloro-2-(N-lower alkyl-carbamyl) - 7 - sulfamyl-3,4-dihydro-2H-1,2,4-benzothiadiazine-1,1-dioxide.

3. 6-chloro - 2 - (N-ethyl-carbamyl)-7-sulfamyl-3,4-dihydro-2H-1,2,4-benzothiadiazine-1,1-dioxide.

4. 2-(N-n-butyl-carbamyl) - 6 - chloro-7-sulfamyl-3,4-dihydro-2H-1,2,4-benzothiadiazine-1,1-dioxide.

5. 6-chloro-3-chloro-lower alkyl-2-(N-lower alkyl-carbamyl) - 7 - sulfamyl - 3,4-dihydro- 2H-1,2,4-benzothiadiazine-1,1-dioxide.

6. 2 - (N-n-butyl-carbamyl)-6-chloro-3-chloromethyl-7-sulfamyl - 3,4 - dihydro-2H-1,2,4-benzothiadiazine-1,1-dioxide.

7. 6-chloro-3-chloro-lower alkyl-2-(N-lower alkyl-carbamyl)-7-[N-(N-lower alkyl-carbamyl)-sulfamyl] - 3,4-dihydro-2H-1,2,4-benzothiadiazine-1,1-dioxide.

8. 2 - (N-n-butyl-carbamyl)-7-[N-(N-n-butyl-carbamyl)-sulfamyl]-6-chloro-3-chloromethyl-3,4-dihydro - 2H-1,2,4-benzothiadiazine-1,1-dioxide.

9. 6-chloro-2-lower alkyl - 7 - [N-(N-lower alkyl-carbamyl)-sulfamyl] - 3,4 - dihydro-2H-1,2,4-benzothiadiazine-1,1-dioxide.

10. 7 - [N-(N-n-butyl-carbamyl)-sulfamyl]-6-chloro-2-methyl - 3,4 - dihydro-2H - 1,2,4 - benzothiadiazine-1,1-dioxide.

References Cited by the Examiner
UNITED STATES PATENTS

| | | | |
|---|---|---|---|
| 2,886,566 | 5/1959 | Novello | 260—243 |
| 2,894,948 | 7/1959 | De Stevens et al. | 260—243 |
| 2,964,560 | 12/1960 | Haack et al. | 260—556 |
| 2,965,655 | 12/1960 | Novello | 260—243 |
| 2,968,158 | 1/1961 | Ruschig et al. | 260—556 |
| 2,995,586 | 8/1961 | Konig et al. | 260—397.7 |
| 3,007,948 | 11/1961 | Johnson | 260—397.7 |

NICHOLAS S. RIZZO, *Primary Examiner.*